(12) United States Patent
Bering et al.

(10) Patent No.: US 8,347,994 B2
(45) Date of Patent: Jan. 8, 2013

(54) TRACTOR HOOD AIRFLOW SYSTEM

(75) Inventors: Christopher A. Bering, Dike, IA (US);
Scott K. Farlow, Cedar Falls, IA (US);
Ryan M. Krogh, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/085,614

(22) Filed: Apr. 13, 2011

(65) Prior Publication Data

US 2012/0261202 A1    Oct. 18, 2012

(51) Int. Cl.
*B60K 13/02* (2006.01)

(52) U.S. Cl. .................. 180/68.3; 180/68.1; 180/68.2

(58) Field of Classification Search ............ 296/193.11; 180/68.1, 68.2, 68.3
See application file for complete search history.

(56) References Cited

U.S. PATENT DOCUMENTS

| | | | | |
|---|---|---|---|---|
| 4,071,009 | A * | 1/1978 | Kraina | 123/198 E |
| 5,297,517 | A * | 3/1994 | Brandt et al. | 123/198 F |
| 6,374,936 | B1 * | 4/2002 | Smith | 180/89.17 |
| 6,655,486 | B2 * | 12/2003 | Oshikawa et al. | 180/68.1 |
| 7,051,786 | B2 | 5/2006 | Vuk | |
| 7,325,518 | B2 * | 2/2008 | Bering | 123/41.01 |
| 7,383,905 | B2 * | 6/2008 | Lang et al. | 180/68.1 |
| 7,584,722 | B2 * | 9/2009 | Sobotzik | 123/41.11 |

* cited by examiner

*Primary Examiner* — J. Allen Shriver, II
*Assistant Examiner* — James Triggs

(57) ABSTRACT

A vehicle engine enclosure includes a tractor frame which supports an engine. A cooling system is mounted on the frame. The cooling system has a housing which surrounds cooling components. A hood is mounted on the frame and encloses the engine and the cooling system. The hood includes a top panel and left and right hood side panels. The top panel has outlet vents formed therein. A pair of left and right side plates are mounted on the frame. A rear end plate covers a rear end of the hood. A plurality of seals are placed between these components so that a duct is formed which collects hot air and moves it vertically through the vents to prevent re-ingesting of the hot air.

12 Claims, 7 Drawing Sheets

TRACTOR HOOD AIRFLOW SYSTEM

FIELD OF THE INVENTION

The present disclosure relates to an electronic engine control system which utilizes an exhaust emissions sensor and adaptively maintains a given emissions level.

BACKGROUND OF THE INVENTION

On slow moving vehicles, such as an agricultural tractor, the hot air which exits the cooling system may be recirculated or re-drawn into the intake of the cooling system. This reduces the potential of the air stream to do useful cooling, thereby increasing the mass of air required for cooling, and as a result, increasing the amount of fan power required. Fan power is parasitic in nature and with the need for improved efficiency, keeping the fan power low is a high priority.

In addition, Tier IV regulations require additional hardware that, if mounted in the engine enclosure, will require a thermal management strategy to prevent damage due to excessive under hood temperatures.

A known vehicle cooling system is described in U.S. Pat. No. 7,051,786 issued on 30 May 2006 and assigned to the assignee of this application. In this system the hood has openings in its upper surface through which passes air blown by the radiator fan unit and the charge air cooler fan unit. This cooling system blows heated cooling air vertically upwardly, thus preventing the heated cooling air from being drawn back into the intakes of the cooling system and preventing heated air from being blown onto the exterior of the tractor cab. However, this system requires multiple cooling units and corresponding electric motor-driven fans to blow air upwardly.

Another known vehicle cooling system is described in U.S. Pat. No. 7,325,518 issued on 8 Sep. 2005 and assigned to the assignee of this application. This cooling system includes a pair of heat exchangers, such as an oil cooler and a charge air cooler, laterally spaced apart from each other and located in front of a front end of the engine. A pair of blower units are in front of the coolers and blow cooling air rearwardly therethrough. A pair of duct units are located above the engine and to the rear of the coolers. Each duct unit includes a forward opening inlet receiving warmed air from the corresponding cooler, an upwardly opening outlet and a hollow housing extending from the inlet to the outlet. The outlets are spaced laterally apart from each other. A radiator is positioned above the duct unit housings and forward of the outlets. A set of radiator fans blow air upwardly through the radiator and are positioned between the radiator and the duct housings. However, with this cooling system, the ducting required to direct the air flow uses up valuable space under the hood. Also, the amount of air movement under the hood was limited.

Most prior and current production tractors do not have enclosed engine compartments. Some prior and current production tractors, such as the John Deere 8030 tractor has ducts that prevent the air from even getting to the engine compartment. Other known production tractors have an enclosed engine compartment, but have significant louvers to allow airflow to exit on the sides.

SUMMARY

According to an aspect of the present disclosure, a vehicle engine enclosure includes a tractor frame which supports an engine. A cooling system is mounted on the frame. The cooling system has a housing which surrounds cooling components. A hood is mounted on the frame and encloses the engine and the cooling system. The hood includes a top panel and left and right hood side panels. The top panel has outlet vents formed therein. A top seal seals between the housing and the top panel. A pair of left and right side plates are mounted on the frame 13. A pair of side seals are provided. Each side seal seals between one of the hood side panels and a corresponding one of the side plates. A pair of lower seals are provided. Each lower seal sealing between the frame and a corresponding one of the side plates. A rear end plate covers a rear end of the hood. A rear seal seals between the rear end plate and the hood. The hood, side plates, frame, engine and cooling system housing cooperate to form a duct which collects hot air and moves it vertically through the vents to prevent re-ingesting of the hot air.

The engine enclosure also includes a front seal which has an upper strip and upper side strips which extend downwardly from the upper strip. The upper strip forms a seal between the housing and the hood top panel. The upper side strips form a seal between the sides of the housing and the front side plates. The front seal also includes lower side strips which connect the upper side strips with a front lower seal strip. The lower side strips seal between the hood and the front side plates.

As a result, with this design the engine compartment and chassis are used to perform as a duct to minimize recirculation to the front grill screen. This improves tractor and cooling system performance, and provides thermal management of the under hood components.

DETAILED DESCRIPTION OF THE DRAWINGS

Figure 1:
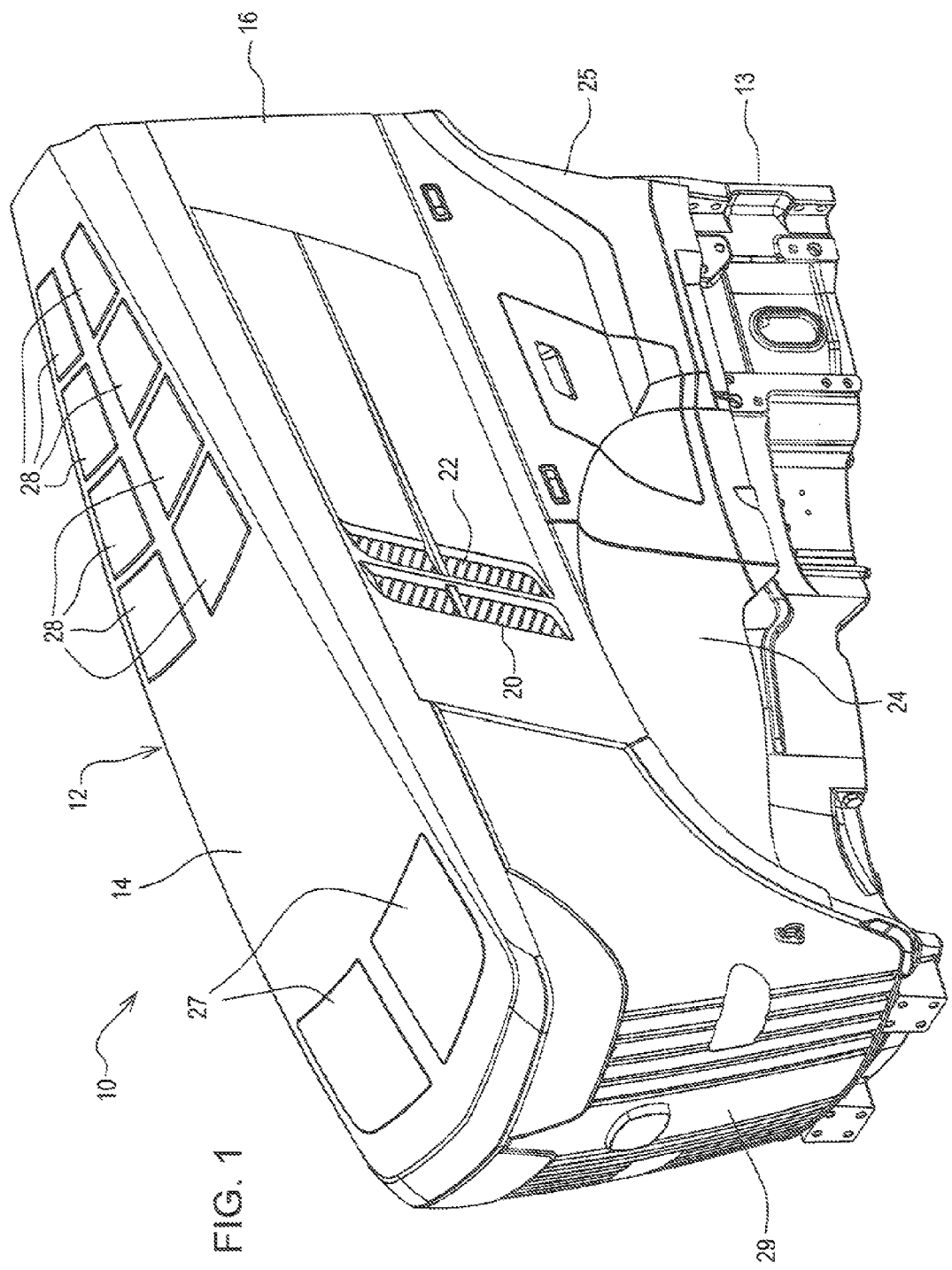
FIG. 1 is a perspective view of an engine enclosure according to the present invention.

Referring to FIGS. 1-4, a tractor engine enclosure 10 includes a hood 12 which is pivotally supported near it rear end in a conventional manner on a hood pivot frame 11 which is supported on the tractor frame 13. The hood 12 includes an upper panel 14 and a pair of side panels 16 and 18 which depend downwardly from the upper panel 14. A pair of side vents 20, 22 are formed in each of the side panels 16, 18. The enclosure also includes a pair of front lower side plates 24 and 26 and a pair of rear lower side plates 25 and 27, all of which are removable and which are supported on the frame 13. The rear side plates 25 and 27 are preferably contoured to fit around the engine 30 and to fit to the frame 13. A plurality of upper openings or vents 28 are formed in the upper panel 14. A pair of inlet openings 27 is formed in a forward end of the hood upper panel 14. The hood 12 includes a mesh type grill 29 at the front end thereof.

The enclosure 10 encloses a conventional internal combustion engine 30 which is mounted on the frame 13. The enclosure 10 also encloses a cooling system 32 which includes a rotary fan 34 with an outer shroud 36 connected to a housing 38 which surrounds known cooling system components, such as a radiator (not shown), a charge air cooler (not shown), a hydraulic oil cooler (not shown) and an AC condenser (not shown).

Figure 2:
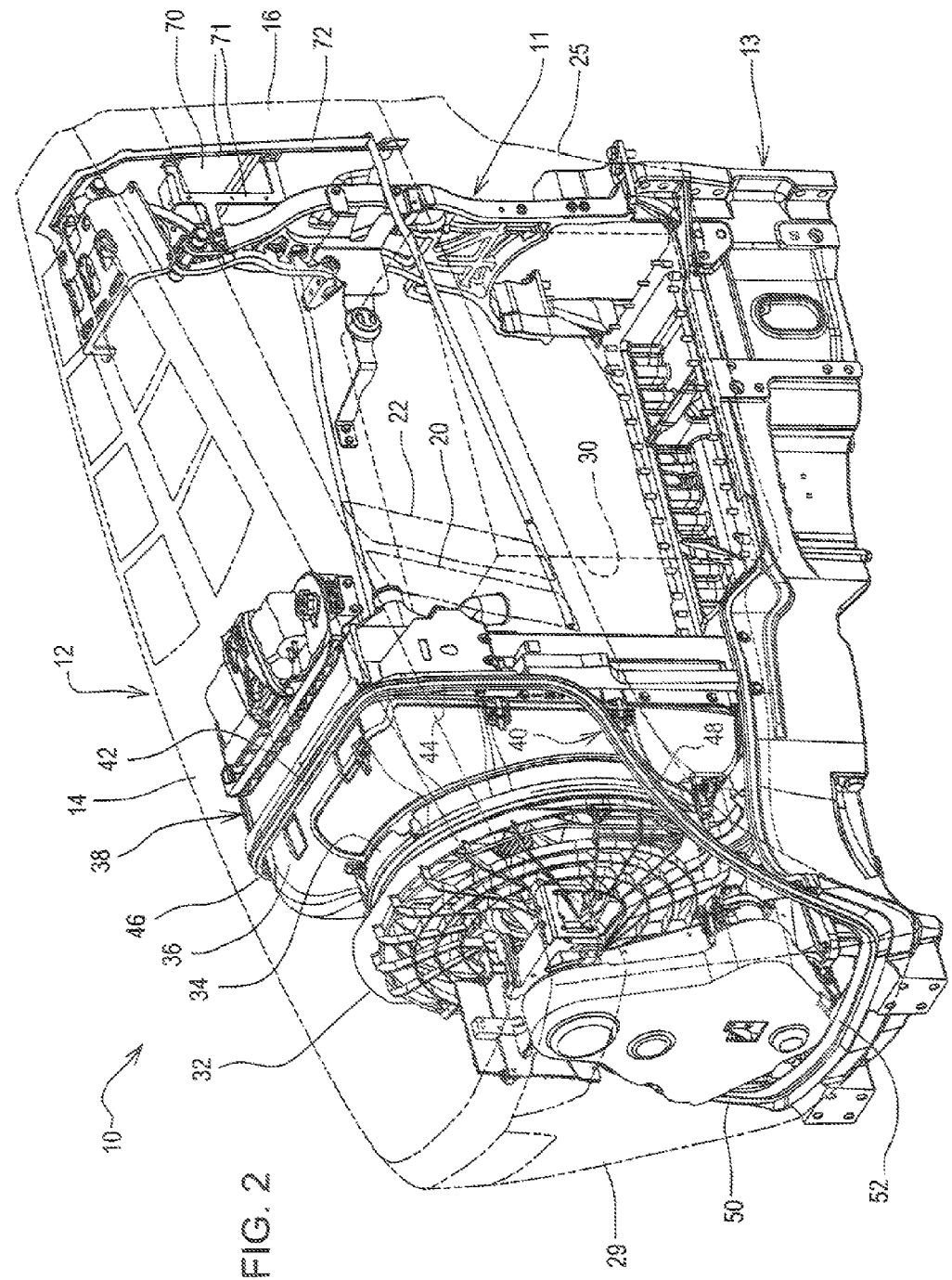
FIG. 2 is a perspective view of the engine enclosure of FIG. 1 with the hood in phantom.
Figure 3:
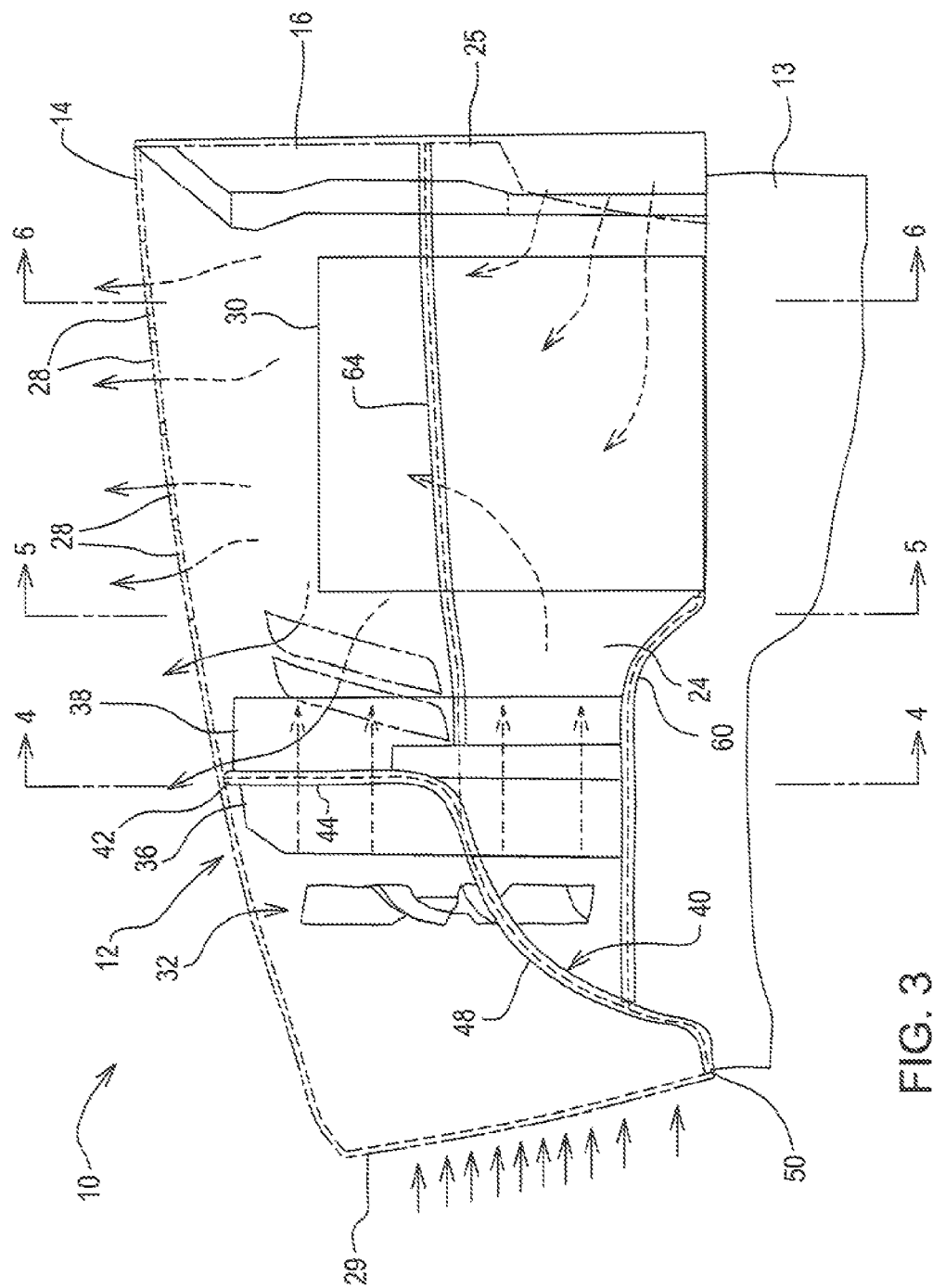
FIG. 3 is side sectional view of the engine enclosure of FIG. 1.
Figure 4:
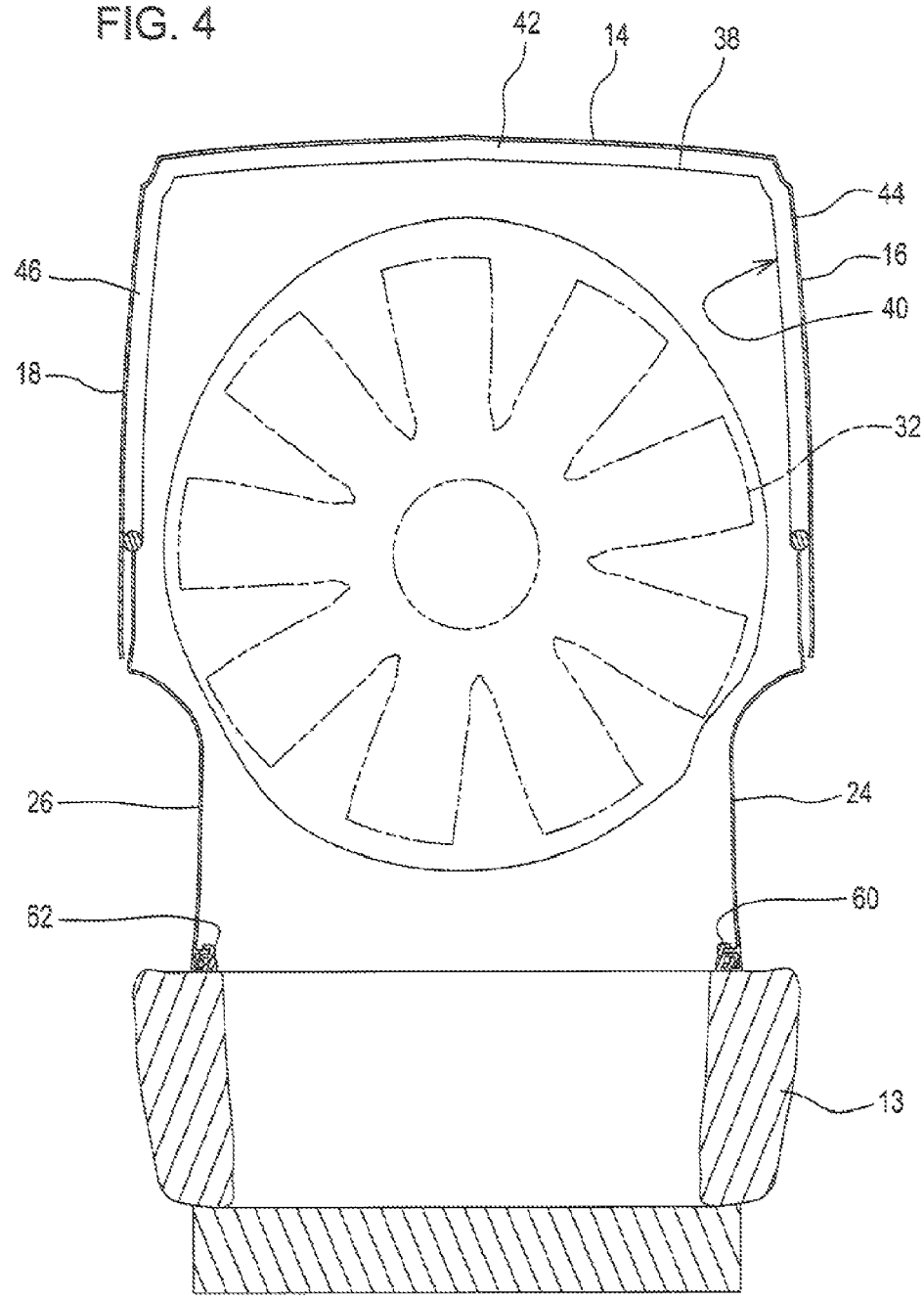
FIG. 4 sectional view along lines 4-4 of FIG. 3.

As best seen in FIGS. 2, 3 and 4, the enclosure 10 includes a front seal 40. Front seal 40 has an upper strip 42 and side strips 44 and 46 which extend downwardly from upper strip 42. The upper strip 42 forms a seal between the housing 38 and the hood upper panel 14. The side strips 44 and 46 form a seal between the sides of the housing 38 and the front side plates 24 and 26, respectively. Curved side seal strips 48 and 50 connect side strips 44 and 46, respectively with a front lower seal strip 52. Seal strips 48 and 50 seal between the hood 12 and the front side plates 24 and 26.

As best seen in FIGS. 3 and 4, the enclosure 10 also includes lower side seals 60 and 62. Seals 60 and 62 seal between an upper surface of the frame 13 and a lower edge of the front side plates 24 and 26, respectively.

Figure 5:
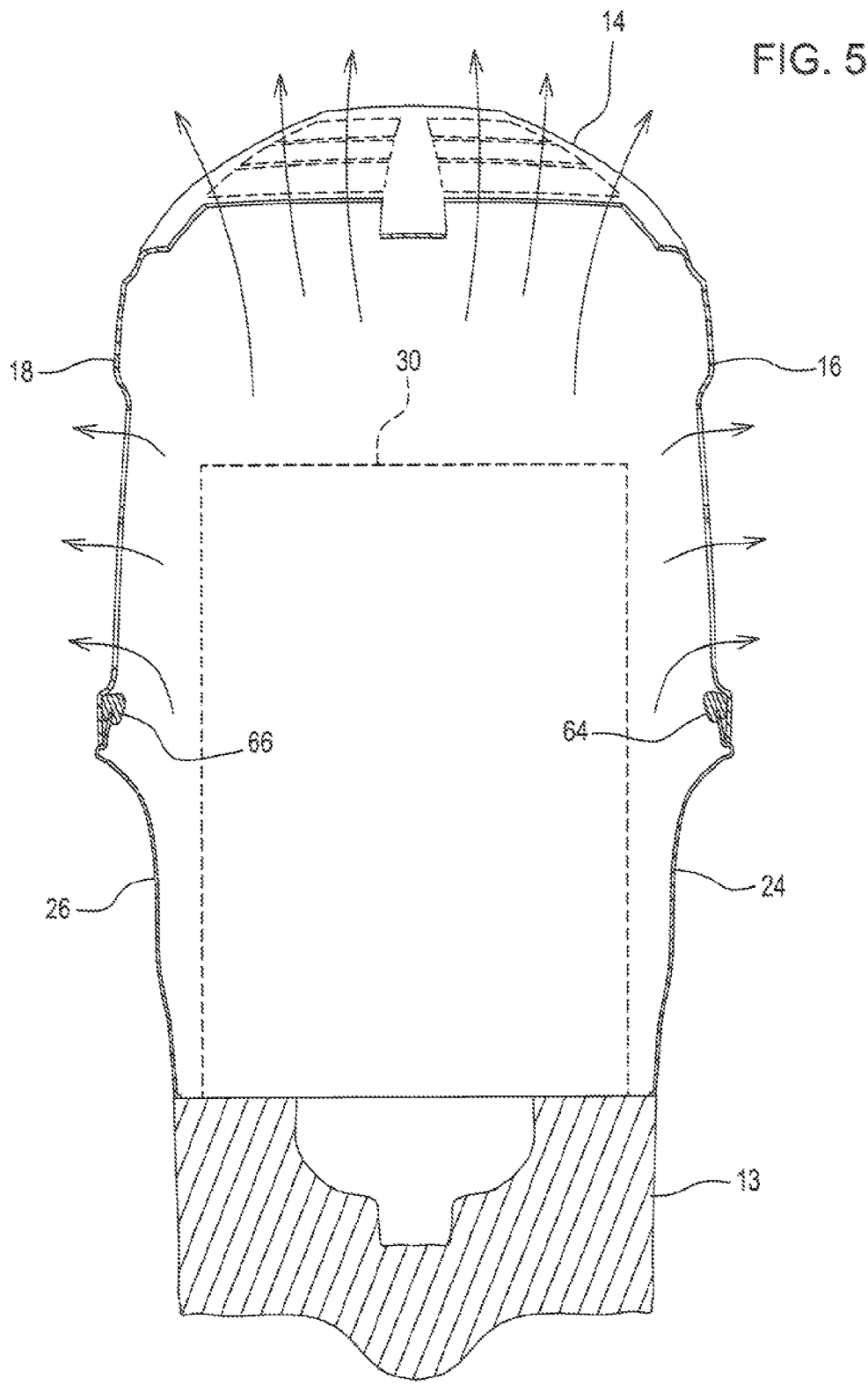
FIG. 5 sectional view along lines 5-5 of FIG. 3.
Figure 6:
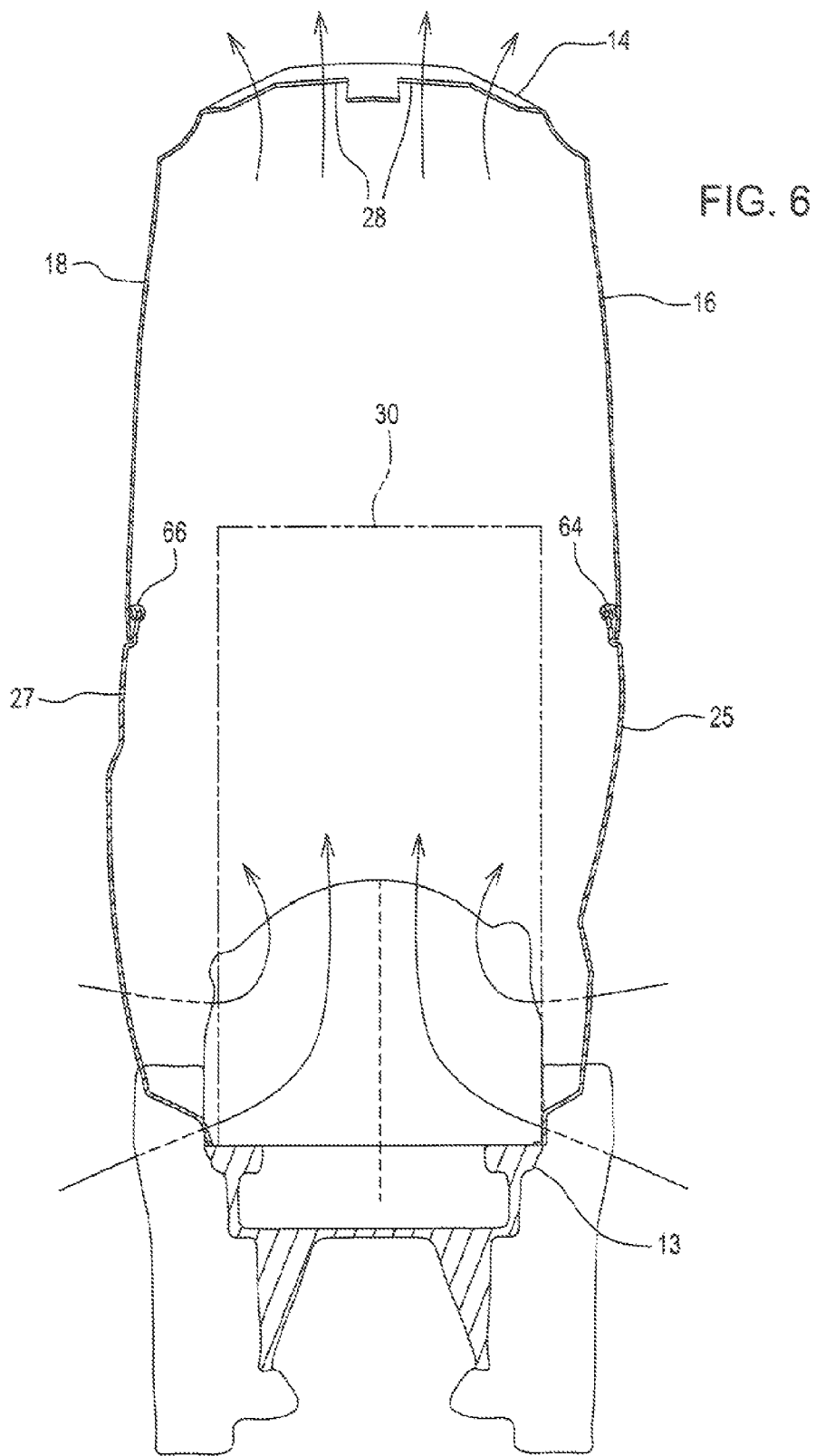
FIG. 6 sectional view along lines 6-6 of FIG. 3.
Figure 7:
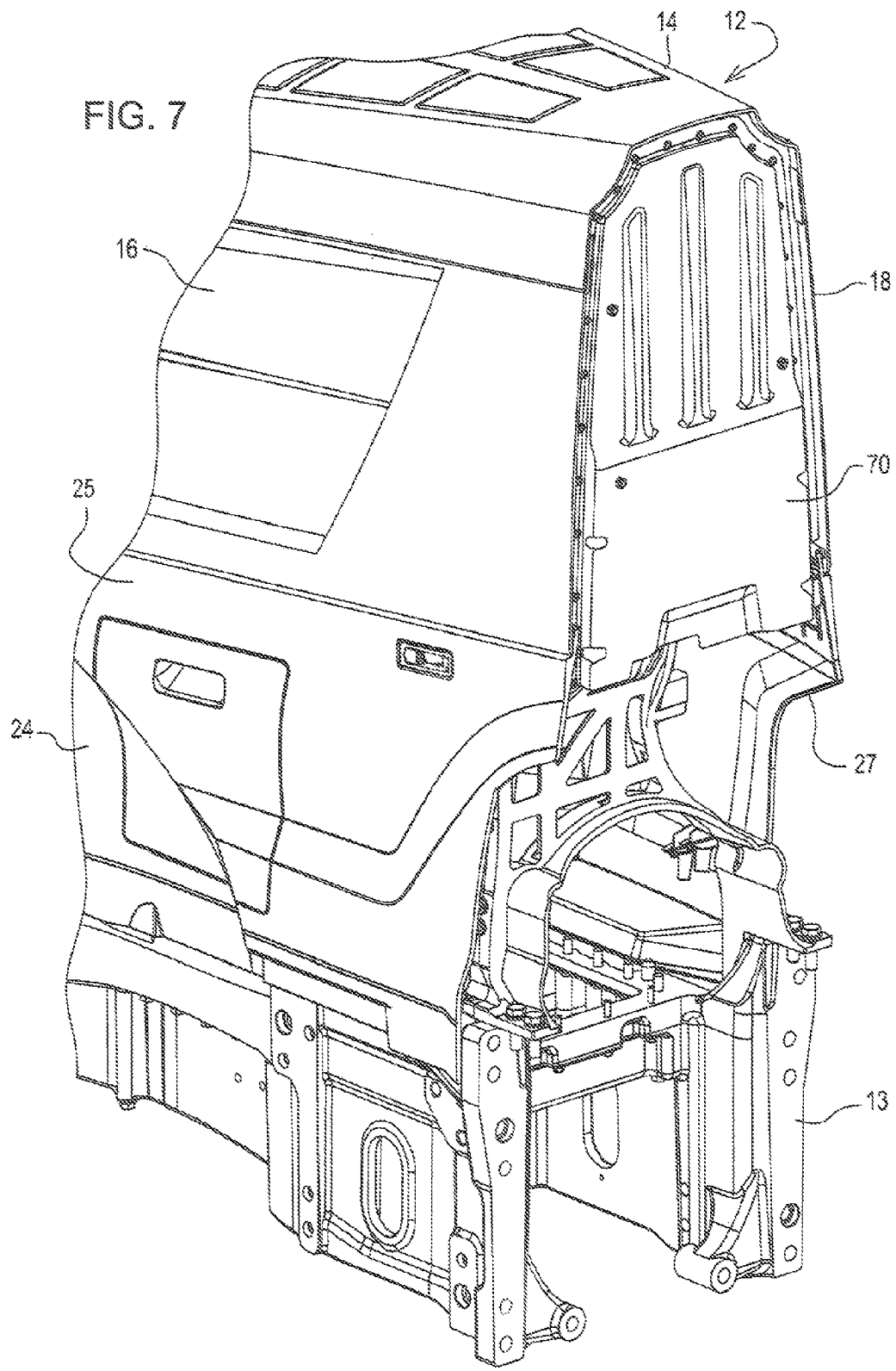
FIG. 7 is a rear perspective view of the engine enclosure of FIG. 1.

As best seen in FIGS. 3, 5 and 6, the enclosure 10 also includes upper side seals 64 and 66. Seals 64 and 66 form seals between a lower edge of the hood side panels 16 and 18, and an upper edge of the rear side plates 25 and 27, respectively.

As best seen in FIGS. 2 and 8, the enclosure 10 also includes a rear end plate 70 which covers or fills the rear end of the hood 12 and which is attached by bracket 71 to the pivot frame 11. A seal 72 seals between the rear and plate 70 and the upper panel 14 and the side panels 16 and 18.

The result is an engine enclosure which directs the hot air leaving the cooling system 32 and which performs the function of a duct which collects the hot air and moves it vertically away from the tractor to prevent re-ingesting the air. In essence, the kinetic energy in the air stream leaving the cooling system 32 is transformed into potential energy in the form of pressure under the hood 12 and released as kinetic energy from openings 28 in the hood top panel 14 in the form of an air blast. The air leaving the hood openings 28 is directed so it does not get re-ingested or get thrown against the cab glass (not shown) causing addition cab heating.

The advantage of this design is that the space, which would otherwise be needed to accommodate large ducts to direct the hot air flow, is made available for other purposes. In addition, a constant flow of air is provided to the engine compartment to prevent temperature related damage from the increased heat load associated with hardware required by regulations.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle engine enclosure, comprising:
an engine mounted on a tractor frame;
a cooling system mounted on the frame, the cooling system having a housing surrounding cooling components; and
a hood, the hood being mounted on the frame and enclosing the engine and the cooling system, the hood comprising a top panel and left and right hood side panels, the top panel having a vent therein, the hood, the frame, the engine and the cooling system housing cooperating to form a duct which collects hot air and moves it vertically through the vent to prevent re-ingesting of the hot air.

2. The engine enclosure of claim 1, further comprising:
a top seal sealing between the housing and the top panel;
a pair of left and right side plates mounted on the frame; and
a pair of side seals, each side seal sealing between one of the hood side panels and a corresponding one of the side plates.

3. The engine enclosure of claim 2, further comprising:
a pair of lower seals, each lower seal sealing between the frame and a corresponding one of the side plates.

4. The engine enclosure of claim 1, further comprising:
a pair of lower seals, each lower seal sealing between the frame and a corresponding one of the side plates.

5. The engine enclosure of claim 1, further comprising:
a pair of left and right side plates mounted on the frame, the side plates, the hood, the frame, the engine and the cooling system cooperating to form a duct which collects hot air and moves it vertically through the vent and away from the tractor to prevent re-ingesting of the hot air.

6. The engine enclosure of claim 1, further comprising:
a rear end plate covering a rear end of the hood.

7. The engine enclosure of claim 6, further comprising:
a rear seal which seals between the rear end plate and the hood.

8. The engine enclosure of claim 2, further comprising:
a front seal having an upper strip and upper side strips which extend downwardly from the upper strip, the upper strip forming a seal between the housing and the hood top panel, the upper side strips forming a seal between the sides of the housing and the front side plates, respectively.

9. The engine enclosure of claim 8, wherein:
the front seal further comprises lower side strips which connect the upper side strips with a front lower seal strip, the lower side strips sealing between the hood and the front side plates.

10. A vehicle engine enclosure 40, comprising:
an engine mounted on a tractor frame;
a cooling system mounted on the frame, the cooling system having a housing surrounding cooling components;
a hood, the hood being mounted on the frame and enclosing the engine and the cooling system, the hood comprising a top panel and left and right hood side panels, the top panel having a vent therein;
a top seal sealing between the housing and the top panel;
a pair of left and right side plates mounted on the frame;
a pair of side seals, each side seal sealing between one of the hood side panels and a corresponding one of the side plates;
a pair of lower seals, each lower seal sealing between the frame and a corresponding one of the side plates;
a rear end plate covering a rear end of the hood; and
a rear seal which seals between the rear end plate and the hood, the hood, side plates, frame, engine and cooling system housing cooperating to form a duct which collects hot air and moves it vertically through the vent to prevent re-ingesting of the hot air.

11. The engine enclosure of claim 10, further comprising:
a front seal having an upper strip and upper side strips which extend downwardly from the upper strip, the upper strip forming a seal between the housing and the hood top panel, the upper side strips forming a seal between the sides of the housing and the front side plates, respectively.

12. The engine enclosure of claim 11, wherein:
the front seal further comprises lower side strips which connect the upper side strips a front lower seal strip, the lower side strips sealing between the hood and the front side plates.

* * * * *